June 15, 1965  J. C. DANKO ETAL  3,189,765
COMBINED THERMIONIC-THERMOELECTRIC CONVERTER
Filed June 15, 1960  5 Sheets-Sheet 1

WITNESSES

INVENTORS
Peter J. McCoy &
Joseph C. Danko
BY
ATTORNEY

June 15, 1965  J. C. DANKO ETAL  3,189,765
COMBINED THERMIONIC-THERMOELECTRIC CONVERTER
Filed June 15, 1960  5 Sheets-Sheet 3

June 15, 1965 J. C. DANKO ETAL 3,189,765
COMBINED THERMIONIC-THERMOELECTRIC CONVERTER
Filed June 15, 1960 5 Sheets-Sheet 5

United States Patent Office 3,189,765
Patented June 15, 1965

3,189,765
COMBINED THERMIONIC-THERMOELECTRIC CONVERTER
Joseph C. Danko, Pitcairn, and Peter J. McCoy, Pittsburgh, Pa., assignors to Westinghouse Electric Corporation, East Pittsburgh, Pa., a corporation of Pennsylvania
Filed June 15, 1960, Ser. No. 36,269
7 Claims. (Cl. 310—4)

The present invention relates to an arrangement for the direct conversion of heat into electricity and more particularly to a combined thermionic-thermoelectric converter arranged in certain modifications thereof for use either with a radioisotope or a fluid heat source and in other modifications in further combination with a nuclear reactor fuel element.

The invention is further adapted for incorporation into various types of heterogeneous nuclear reactors in which a nuclear chain reaction is induced within an array of relatively stationary fuel elements contained within the reactor. One or more of the fissionable isotopes U–233, U–235 and PU–239 are incorporated within the fuel elements and the chain reaction is propogated by neutrons during operation of the reactor, in a well known manner. The fuel elements usually are spaced relative to one another within the interior of the reactor so that a coolant fluid such as pressurized water, carbon dioxide, helium or an organic material which is liquid at reactor operating temperatures, can be circulated among the fuel elements. If the coolant is water or an organic material, the same also can serve as the reactor moderator for slowing the fast fissional neutrons to velocities at which the greatest possibility exists for inducing fission. The reactor is controlled by the insertion of control rods or other material, containing neutron absorbers, into the reactor in order to maintain a chain reaction at a given power level by the absorption of excess neutrons.

Contrary to prevailing beliefs, a nuclear reactor is not a relatively low temperature device, but is only so limited in its conventional forms by the character of the coolant materials which are employed. Another limitation involves the fact that, without special construction, a reactor is not readily capable of imparting superheat to a working fluid, such as steam. Both of these factors result in a rather inefficient use of conventional thermodynamic generating equipment usually associated with a reactor in a nuclear power plant.

The present invention, when combined with reactor fuel elements, is adapted for converting a portion of the total reactor thermal output directly into electrical energy and in doing so the conversion takes place in the areas of high temperature gradient within the reactor core, that is to say before the fissional heat is dissipated into the reactor coolant. More specifically, the combined thermionic-thermoelectric converter is so associated with the elevated portions of the temperature gradient such that each component of the converter is operated at optimum temperature ranges. The same holds true when the converter is combined with a radioisotope or conventional heat source. When combined with a reactor, however, as described hereinafter, no heat energy is lost during the direct-conversion process, inasmuch as any heat flux through the converter, which is not converted into electrical energy, is removed from the reactor by a circulation of a suitable reactor coolant.

In view of the foregoing, an object of the present invention is the provision of a novel and efficient means and method for converting thermal energy directly into electrical energy.

A further object of the invention is the provision of novel thermionic-thermoelectric converting means adapted for use within a nuclear reactor or with a radioisotope source of heat. More generally, it is an object of the invention to provide an energy converter of the character described, which can be adapted for use with any suitable source of heat.

Another object of the invention is the provision of a novel and efficient nuclear fuel element adapted for converting a portion of the fissional heat thereof directly into electrical energy.

Another object of the invention is the provision of a novel and efficient form of energy converter. More specifically, it is an object of the invention to provide means for mounting and operating a relatively large number of such converters in electrical series or series-parallel arrangements to obtain usable quantities of electrical energy.

A further object of the invention is the provision of a novel and efficient fuel element for a nuclear reactor. It is more specifically an object of the invention to combine a reactor fuel element with the energy converter described herein in a novel and efficient manner.

These and other objects, features and advantages of the invention will be elaborated upon during the forthcoming description of illustrative modifications thereof, with the description being taken in conjunction with the accompanying drawings wherein.

In accordance with the invention, a novel arrangement is provided for combining thermionic and thermoelectric energy converters and, in other modifications of the invention, for further combining the resultant arrangement with fissional or radioisotopic heat sources. The basic theory of thermionic energy conversion is discussed in G. R. Feaster's Patent No. 2,980,819, entitled "Thermal Energy Converter," issued April 18, 1961, and assigned to the present assignee. Further, as taught by the invention, novel means are associated with the enery converter for withdrawing the resultant electric energy therefrom.

Figure 1:
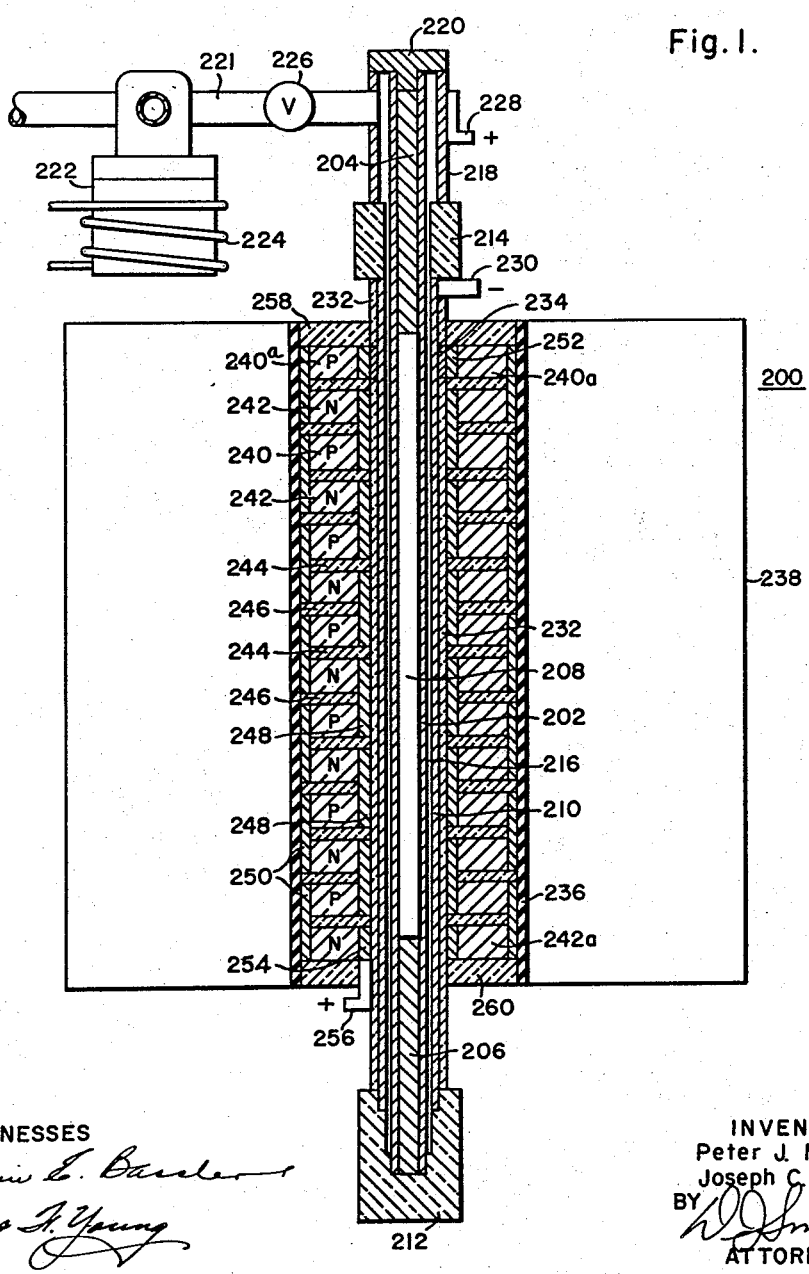
FIGURE 1 is a longitudinally sectioned view of an exemplary form of the thermionic-thermoelectric energy converter constructed in accordance with the invention.

Referring now to FIG. 1 of the drawings, an illustrative embodiment of the thermionic-thermoelectric converter is depicted therein. In this example of the invention, the converter is adapted for use with a radioisotopic heat source; however, it will be readily apparent as this description proceeds that a more conventional heat source can be applied. The converter 200 in this arrangement includes a cathode 202, which is tubular in form and is sealed adjacent its ends by rod-like end plugs 204 and 206, respectively. Before completely sealing the cathode 202 in this fashion, however, a mass of radioactive isotope 208, such as curium carbide ($Cm^{242}$), is inserted into the cathode 202. The melting point of this radioactive material is about 2000° C. and the specific power is 114.3 watts per gram. Inasmuch as the density of curium carbide is 10 grams per cc., the power density amounts to 1143 watts per cc. The half life of $Cm^{242}$ is 162.5 days and a 6.11 m.e.v. alpha particle is released. The attractiveness of curium carbide for this purpose stems not only from its power density but also from the fact that it remains solid at cathode temperatures. Other radioisotopes can be employed, of course, and if necessary or desirable to obtain an elevated temperature they can be permitted to liquefy or to vaporize.

Spaced outwardly of the cathode 202 is a tubular anode 210. The lower end of the anode 210 is partially inserted into a supporting and insulating block 212 of ceramic material such as aluminum oxide. The other end of the anode 210 is sealed to an annular insulator 214 for the purpose of insulating the anode 210 from the cathode 202. Desirably the insulator 214 is also fabricated from aluminum oxide. Other ceramics can be used such as magnesium oxide, zirconium oxide or beryllium oxide.

In this specification the term "annular" is not to be restricted to a member having inner and outer circular peripheries but is also to include a member with inner and outer peripheries having a configuration different than circular.

The anode 210 and the cathode 202 thus enclose an annular space or plasma gap 216 therebetween. The space 216 is completely enclosed by a tubular extension 218 sealed to the other end of the insulator 214 and to an end cap 220. The end cap 220 also is joined to the adjacent end of the cathode 202 and is provided with a central extension to position the cathode 202 in this example coaxially of the anode 210. The other end of the cathode 202 is similarly positioned by embedding in the supporting block 212. The tubular extension 218 is provided with a conduit 221, through which vaporized rubidium, cesium, or other alkali metal is supplied to the plasma gap 216 from the reservoir 222. The latter is heated by an electric coil 224 to maintain the corresponding metal in a molten condition. Flow of vapors through the conduit 221 is controlled by a suitable valve 226. The purpose of the alkali metal vapor is to reduce the space charge in the plasma gap 216 and also to minimize the work function of the anode 210, as described more fully hereinafter in connection with FIGS. 2 to 4. The tubular extension 218 is further provided with an electric lead, denoted generally by the reference character 228, which serves as the positive connection to the thermionic stage of the converter. When connected to a load, current flows through the lead 228 via the extension 218, the cap 220 and the cathode 202, all of which are fabricated from electrically conductive material. A similar lead 230 is connected directly to the anode 210 to serve as the negative terminal of the thermionic stage.

The major proportion of the exterior surface of the anode 210 is covered by insulating material designated generally by the reference numeral 232. The insulating material 232 in this arrangement extends from the annular insulator 214 to the supporting block 212 save for a relatively narrow annular band which is occupied by a conductive ring 234. The ring 234 is shrunk fit, brazed, or otherwise secured to the exterior surface of the anode 210 to ensure good electrical contact therewith. The purpose of the ring 234 is to establish electrical contact, in a manner presently to be described, with the thermoelectric stage of the converter so that the thermionic and thermoelectric stages share the common negative terminal 230.

In this arrangement of the invention, the aforementioned thermoelectric stage comprises a series of thermocouple junctions arranged such that its one or more hot junctions are arranged in thermal contact with the outer surface of the thermionic anode 210. The aforementioned insulating layer 232 is provided so that when more than one hot junction is employed, these junctions will not be shorted out by the metallic anode 210. A similar insulating coating 236 covers the cold junctions, described hereinafter, of the thermoelectric series so that a plurality of metallic cooling fins 238 secured to the outer surface of the converter 200 will not short circuit the cold junctions. The cooling fins, which can be fabricated from aluminum, are supplied in sufficient number to maintain a desired temperature differential across the thermoelectric stage. If desired, a cylindrical radiator (not shown) can be secured to the outer edges of the cooling fins 238.

In this arrangement of the invention, the thermo-electric stage is formed from a stacked series of washers or wafers 240 and 242, which spacedly surround the thermionic anode 210. The thermoelectric washers in this example are fabricated from lead telluride, which is suitably doped in known manner to form p and n materials 240 and 242, respectively. Alternatively, other suitable thermoelectric materials can be employed, as, combinations of lead telluride and germanium telluride or bismuth germanium telluride. The thermoelectric materials 240 and 242 are separated and insulated from one another by means of annular disks 244 and 246 of mica, aluminum oxide, or other suitable insulating material. The annular disks 244 are provided with a smaller inner diameter so that they will extend between adjacent hot junctions formed by relatively short tubular members 248 joined in electrically conductive relationship to adjacent pairs of the thermoelectric materials 240 and 242. Similarly, the annular disks 246 are provided with larger outside diameters so that they extend between the cold junctions of the thermoelectric arrangement. The cold junctions likewise are formed by relatively short tubular members 250, of larger diameter than that of the tubular members 248, which are likewise joined in electrically conductive relation to other pairs of the thermoelectric materials 240 and 242. In this manner, the stack of wafers 240 and 242 are series connected along the length of the thermionic anode 210 by alternate provision of the tubular members 248 and 250. The uppermost wafer 240a is joined at its inner diameter to a separate tubular member 252, which in turn is connected by shrink fitting or by brazing, for example, to the previously described contacting ring 234. In this manner, electrical contact is established through the negative terminal 230, the upper end portion of the anode 210, the contacting ring 234, and the tubular member 252. The lowermost wafer 242a is secured in a similar manner to a separate tubular member 254, which however is connected electrically to the positive terminal of the thermoelectric stage, represented by the lead 256.

The energy converter, in operation, can have a cathode temperature in the neighborhood of 2000° C. or higher indicated previously, when the aforementioned radioisotope curium carbide is employed. For this cathode temperature, a suitable material is selected from the group of materials listed below in connection with FIGS. 2 to 4. Due to the interposition of the plasma gap 216 and the resulting temperature gradient, the anode will operate at a temperature of about 800° C. The hot junctions 248 of the thermoelectric stage also will operate close to the latter-mentioned temperature. As explained previously, a suitable cooling system is associated with the cold junction 250 so that the later operates at about 300° C. Under these conditions, a potential in the order of about 2 or 3 volts will be induced in the thermionic stage while a potential in the order of 1 volt will be induced in the thermoelectric stage. Additional potential can be secured, of course, by increasing the length of the active section of the converter 200 so that additional radioisotope can be inserted into the cathode 202 and so that additional thermoelectric wafers 240 and 242 can be employed. It is also contemplated that the thermoelectric and thermionic stages can be connected in series to obtain a larger single potential output by eliminating lead 230 and interchanging tubular member 252 and conductive ring 234 with tubular member 254 and lead 256, whereby lead 256 then becomes the negative terminal for the thermionic-thermoelectric combination. However, care must be exercised to match the impedances of these stages respectively.

Depending upon the application, the inner tubular members 248 can be fabricated from iron, stainless steel or niobium for example, while the outer tubular members 250 in addition can be formed from copper or aluminum due to their lower operating temperature. A particularly desirable insulating material for the anode covering 232 is beryllium oxide, which has a high thermal conductivity but the requisite electrically insulating property. The protective coverings for the end most thermoelectric materials 240a and 242a are completed by ceramic annular disks 258 and 260 respectively. It is also contemplated in certain applications that tubular members or hot junction 250 and the associated wafers 240 and 242 can be provided with sufficient outer diameters so that the tubular members 250 themselves will serve as cylindrical radiators. In the latter case, of course, the fins 238 and the insulating layer 236 can be omitted.

Figure 2:
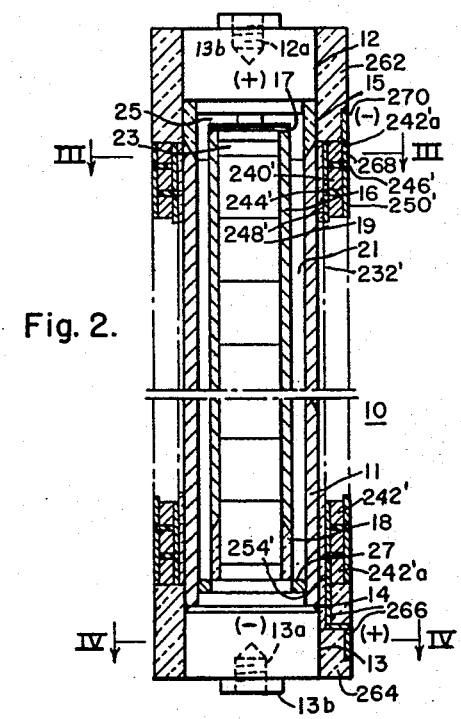
FIG. 2 is a longitudinally sectioned view of another form of the energy converter shown here in combination with a nuclear fuel element and likewise constructed in accordance with the teachings of the invention.
Figure 4:
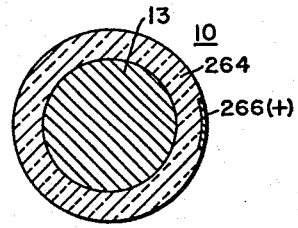
FIG. 4 is another cross-sectional view of the fuel element converter of FIG. 2 but taken along reference line IV—IV thereof.
Figure 3:
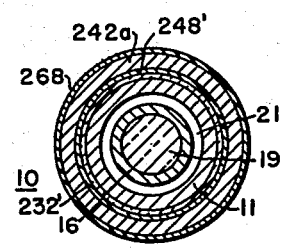
FIG. 3 is a cross-sectional view of the fuel element converter of FIG. 2 and taken along reference line III—III thereof.

Referring now to FIGS. 2 to 4 of the drawings, an illustrative form of a nuclear fuel element-converter arrangement is depicted therein. The converter 10, in this arrangement, includes an envelope 11, which is joined at its ends to stepped plug members 12 and 13. To the end plug 13 the envelope 11 is hermetically sealed by an annular weld 14. Adjacent the other end of the envelope 11, the envelope includes an annular portion of electrically insulating material 15, for example fused aluminum oxide, which is hermetically sealed both to the stepped end plug 12 and to the envelope 11 in a well known manner. In this arrangement of the invention, the envelope 11 serves as the anode in the thermionic stage of the converter 10 and electrical contact is supplied thereto through the end plug 13, which is labeled negative in FIG. 2. For purposes presently to be described, the other end plug 12 is insulated from the anode or envelope 11 by means of insulating portion 15. Each of the end plugs 12 and 13 is provided with a tapped aperture 12a or 13a and a protruding annular portion 12b or 13b for the purposes of securing the converter 10 to insulating end plates 38 and 40 described hereinafter in connection with FIG. 9.

Spaced inwardly of the envelope 11 is a cladding tube 16, which is assembled in a manner similar to that of the envelope 11 to stepped portions of the end plugs 12 and 13. Thus, for example, the upper end of the cladding tube 16 is hermetically sealed to the end plug 12 by means of an annular weld 17. Adjacent the lower end of the cladding tube 16 is an annular insulating portion 18, which similarly is joined to a stepped portion of the end plug 13 and to the remainder of the cladding tube 16 in a well known manner. Thus, the insulating portion 18 is formed and assembled in the manner described in connection with the insulating portion 15.

In this arrangement of the invention, the cladding tube 16 serves the dual function as cathode for the converter 10 and also as a hermetic container for the fuel material denoted generally by the reference character 19 and described hereinafter in greater detail. Electrical contact with the cathode or cladding tube 16 is provided through the end plug 12, which is labeled + in FIG. 2. The cathode 16, of course, is insulated from the other end plug 13 by means of the annular portion 18. An annular space 21 between the cladding tube 16 and the envelope 11 desirably is of the order of 1 millimeter in radial distance, or less, in order further to reduce the effects of a space charge in the converter 10. If desired, the cladding tube 16 in addition can be removed and the fuel material 19 formed as a continuous rod of a fissile material such as dispersions of UC in ZrC or TaC. The latter is a particularly attractive material because of its ultra-high temperature range of operation (c. 3500° C.) and because of its electron emissivity.

However, because these materials tend to yield volatilized carbon at elevated temperatures, which increases the anodal heat losses in certain applications it is desirable to add a separate indirectly heated cathode (not shown) spaced outwardly of the aforementioned fuel rod. The indirectly heated cathode serves not only to confine the volatilized carbon but also provides an avenue between the rod and the indirectly heated cathode, for the removal of fission gases if desired. Moreover, the temperature drop between the fuel rod and the indirectly heated cathode spaced outwardly therefrom permits a wider selection of eligible cathode materials.

The fuel material in certain applications of the invention, however, can include a plurality of pellets which are tandemly inserted into the cladding tube 16 in a well known manner. An expansional space 23 is provided within the cladding tube 16 to permit differential thermal expansion between the cladding tube 16 and the fuel material 19. In furtherance of the same purpose, the innermost stepped portion of the end plug 12 is undercut, as denoted by the reference character 25, to afford differential expansion between the cladding tube 16 and the envelope 11. If desired, the lower end plug 13 can be similarly provided with an undercut portion (not shown) for this purpose.

The fuel material 19 desirably consists essentially of a compound or alloy of uranium or plutonium which is able to withstand elevated temperatures without melting inasmuch as the surface temperature of the cathode or cladding tube 16 should operate in the neighborhood of 1000° C. or higher. Suitable fuel materials include plutonium or uranium carbide, which can be admixed in a graphite matrix if additional moderation is desirable. Also recommended are uranium or plutonium oxides, zirconium-uranium alloys, cermets of uranium or plutonium compounds, and the carbide dispersions mentioned above.

In this embodiment of the invention, the space 21 is evacuated in a well known manner and a source of alkali metal 27 is inserted within the space 21 before assembly of the converter 10. The source 27 can be the alkali metal itself or a suitable alkali metal compound mixed with a suitable reducing agent, which upon heating liberates the alkali metal. As the reactor is being brought to operating temperatures, alkali metal vapors will of course be liberated from the source 27 and will at least partially be located between the cathode 16 and the anode 11. The intervening space 21 of course has been previously evacuated and inasmuch as the cladding tube 16 and the envelope 11 are hermetically sealed, the alkali metal vapor is the only gaseous material within the space 21.

The alkali metals lithium (5.36 volts); sodium (5.11 volts); potassium (4.33 volts); rubidium (4.13 volts) and cesium (3.86 volts) are suitable for use in this invention. The figures within the parenthesis refer to the ionization potential of the respective materials. The cladding tube 16 can be fabricated from a number of materials, but it is important that it can withstand the operating temperatures of the converter 10 and particularly that the cladding tube can be heated sufficiently so that its outer or emissive surface will produce substantial thermionic emission during operation of the converter. Desirably, the emissive surface is at least 1000° C. during operation, and preferably, of the order of 2000° C. in certain applications.

The work function of the cladding tube material should be higher than the ionization potential of the alkali metal employed to ensure contact ionization of the alkali atoms in the material vaporized from the source 27. However, the selection of the cathode material for this purpose is not critical, inasmuch as in accordance with the invention the gamma radiation normally associated with one application of reactor operation will aid in ionizing the alkali metal vapors. A suitable cathode or cladding tube 16, then, can be fabricated from the following materials: niobium (2415° C., 4.0 volts, 1.1 barns); zirconium (1857° C., 4.13 volts, 0.18 barn); molybdenum (2620° C., 4.3 volts, 2.5 barns); palladium (1555° C., 5.0 volts, 8.0 barns); and platinum (1773° C., 6.3 volts, 8.1 barns). The figures in parenthesis refer to the melting point, the work function, and the neutron absorption cross-section, respectively, of each of the foregoing metals. For most reactor applications, the first three materials are preferable due to their low neutronic capture cross-section. Where this factor is not of importance, the following cathode materials can also be employed: osmium (2700° C., 4.7 volts, 14.7 barns); tungsten (3395° C., 4.54 volts, 19.2 barns); and tantalum (2996° C., 4.07 volts, 21.3 barns).

By the same token, nuclear considerations render the alkali metals rubidium (4.13 volts, 0.70 barns); potassium (4.33 volts, 1.97 barns); and sodium (5.11 volts, 0.505 barn); acceptable for most reactor applications. Where this factor is not critical cesium (3.86 volts, 29 barns) and lithium (5.36 volts, 71 barns) can be employed. The figures in parenthesis refer to the work function and the neutronic capture cross-section of these materials respectively.

The anode or envelope 11 is fabricated from a material which is substantially unreactive with the alkali metal, when used. The anode material must also be sufficiently refractory to withstand the temperature of operation which, in general, will be several hundred degrees below the temperature of the cathode 16. The temperature of the anode 11 must be below the temperature of the cathode 16 during operation as thermionic energy converters will not function properly if the cathode and the anode are at the same temperature. Within certain limitations, the greater the temperature difference between the cathode 16 and the anode 11, the more efficiently the device will operate until this differential becomes so great that other undesirable effects occur. To provide a suitable temperature differential, the envelope or anode 11 of the converter 10 is suitably cooled by dissipation of heat into the thermoelectric stage of the converter 10 and thence into the reactor coolant flowing past the thermoelectric stage as described in greater detail hereinafter.

With respect to work function, there is no restriction on the choice of anode material and if desired, the anode 11 can be fabricated from the same material as the cathode or from one of the other previously listed cathode materials. Desirably, however, the work function of the anode 11 is lower than that of the cathode 16 and is lowered still further by a coating of the alkali vapor upon the anodal surface of the envelope 11. Maintaining a differential of work function between the cathode and anode of course increases the electrical output of the converter 10. In an alternative embodiment, the source 27 of alkali metal is omitted and after evacuating the space 21, the latter is filled with helium. The helium fill is ionized by gamma and other radiation during operation of the reactor in order to counteract the effects of the space charge in the converter 10. The positive helium ions operate to neutralize the space charge in the same manner as the ionized alkali metal vapors. In the latter arrangement of the invention, the work function of the cathode material can be lower, as it is no longer necessary to ensure contact ionization of an alkali metal vapor. On the other hand, the work function of the anode material should be substantially lower than that of the cathode in order to secure a suitable voltage output.

In the operation of the converter 10, when the cathode 16 is heated to a sufficiently high temperature, electrons will be emitted from the surface of the cathode and will travel toward the anode 11. When connected to an external load, these electrons appear as current flowing through the end plug 13 and thence through suitable external connections (not shown) to the load and back to the end plug 12 for delivery to the cathode 16. The migration of electrons from the cathode 16 to the anode 11 across the space 21 is facilitated by the presence of positive ions within the space 21. To neutralize the cloud of electrons, otherwise known as a space charge, which would tend to form around the cathode 16, a relatively large number of either alkali metal or helium ions are necessary. These are afforded not only by the ionizing radiation associated with the reactor but also by operating the converter 10 in a region of relatively high ambient temperature. Satisfactory results have been obtained when the gaseous filling of the converter 10 is maintained between 0.01 and 20 millimeters of mercury. The high ambient temperature results from the fact that the normal reactor coolant temperature is in the neighborhood of 600° F. or higher.

A considerable portion of the fissional heat, however, will be transferred through the thermionic stage by thermal radiation from the cathode 16 to the anode 11. This portion of the reactor heat, of course, is not converted directly into electric energy but instead is transferred to the thermoelectric stage now to be described with reference to FIGS. 2 to 4 of the drawings, and thence to the reactor coolant. In preparation for applying the thermoelectric stage to the outer surface of the anode 11, an insulating layer 232' is applied thereto. The thermoelectric stage proper comprises a stack of thermoelectric washers 240' and 242'. The thermoelectric materials comprising the washers 240' and 242' are respectively positive and negative materials. With the exception of size, the washers 240' and 242' are in all respects similar to the washers 240 and 242 of FIG. 1. In the present arrangement of the invention, the radial thicknesses of the washers 240' and 242' are relatively decreased for the purpose of minimizing the spacing between adjacent fuel element-converters 10. Accordingly, the thermoelectric washers 240' and 242' are connected to form hot and cold junctions therebetween by means of the tubular connecting elements 248' and 250' respectively, which are insulated from one another by the annular insulating disks 244' and 246'. Thus, the heat passing through the thermoelectric stage and not converted into electric energy is transferred to the reactor coolant flowing longitudinally of the converter 10, in a manner presently to be described, by means of the outer tubular connecting members or cold junctions 250'. The outer tubular connectors 250' also serve to protect the thermoelectric elements 240' and 242' from any errosive or corrosive action of the reactor coolant. In furtherance of this purpose, the ceramic insulating disks 246' can be sealed adjacent their outer edges to the adjacent tubular members 250', by well known techniques.

The inner and outer tubular members 248' and 250', in this example of the invention, are fabricated from a material having a relatively low neutronic capture cross-section, such as stainless steel, zirconium, or zirconium alloy. For the same reasons, the insulating disks 246' and 244' and the insulating covering 232' are fabricated from the material such as alumina, magnesia, or zirconium.

The thermoelectric stage just described desirably is maintained under a light compressive force at its desired position along the outer surface of the anode 11 by means of relatively heavy insulating sleeves 262 and 264. These insulating sleeves desirably have the same radial thickness as the combined thicknesses of the thermoelectric stage and the insulating layer 232' and in addition extend to the upper and lower extremities of the end plugs 12 and 13, respectively, so as to present a smooth external contour of the fuel element-converter 10. The purpose of this arrangement, of course, is to minimize erosion of the converter 10 and to reduce resistance to fluid flow. The lower insulating sleeve 264 is provided with an L-shaped aperture and an adjacent depression, as shown, into which the appropriately shaped conductive members, designated by the reference numeral 266 are inserted respectively. The members 266 can also be fabricated from stainless steel and can be joined as shown to form a conductive path through the insulating sleeve 264, by predipping the members in a suitable brazing material and by subsequent heating after insertion of the members into the sleeve 264. In a similar manner, the uppermost one of the members 266 can be joined to the inner contact 254' of the lowermost thermoelectric washer 242'a. With this arrangement, then, the lowermost one of the members 266 becomes the positive terminal of the thermoelectric stage in much the same manner as that described in connection with terminal 256 of FIG. 1.

In a similar manner, the uppermost thermoelectric washer 242'a is provided with an outer contacting ring 268. The ring 268 is joined by brazing, welding, or by the method presently to be described to an adjacent contacting member 270 seated in a suitable and appropriate recess of the upper insulating sleeve 262. The contacting member 270, then, serves as the negative terminal for the thermoelectric stage of the converter 10. As seen from the drawings, the positions of the positive and negative terminals of the thermoelectric stage are displaced relative to the adjacent ends, respectively, of the converter 10. The purpose of this arrangement is to facilitate establishing electrical contact with the thermoelectric stage when a plurality of the converters 10 are mounted in a fuel assembly described below in connection with FIGS. 9 and 10 of the drawings.

Figure 5:
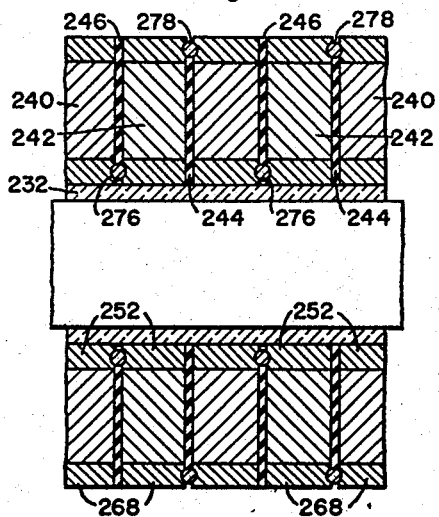
FIG. 5 is an enlarged partial longitudinally sectioned view of a fuel element converter of FIG. 2.
Figure 6:
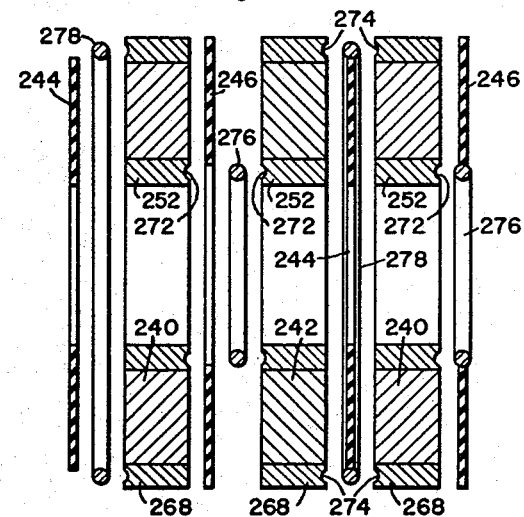
FIG. 6 is an enlarged exploded longitudinally sectioned view of certain of the components employed in fabricating the fuel element of FIG. 2.

Referring now to FIGS. 5 and 6 of the drawings, an exemplary method and arrangement for assembling a hot and cold junction of the thermoelectric stage of FIGS. 1 and 2 are illustrated therein. The thermoelectric assembly is the subject matter of divisional application Serial No. 373,647, filed June 9, 1964, in the names of Peter J. McCoy and Thomas R. Murray, and assigned to the present assignee. In this arrangement of the invention, the thermoelectric washers 240 and 242 have been previously provided with inner and outer contacting rings 252 and 268 respectively, in the manner for example such as that described below in connection with FIGS. 7 and 8. With reference particularly to FIG. 5, it will be seen that a pair of the outer contacting rings 268 are joined to form the cold junction member 250 or 250' while an adjacent pair of the inner contacting rings 252 are similarly joined to form the hot junction member 248 or 248'. In furtherance of this purpose, the adjacent lateral edges of each of these pairs of rings are provided with annular grooves 272 and 274, respectively. Each adjacent pair of the grooves 272 or 274 are thus arranged to receive an O-ring 276 or 278 of suitable diameter, as better shown in FIG. 5 of the drawings. Desirably, the O-rings 276 and 278 are dipped in a brazing material, of known composition, and the entire assembly heated to ensure electrical contact. In furtherance of this purpose, the grooves 272 and 274 can be sized slightly smaller than the corresponding cross-sectional configuration of the rings 276 and 278 respectively. In certain applications, the aforementioned brazing material can be omitted and electrical contact maintained by applying a compressive force to the thermoelectric stage to maintain the previously mentioned force fit. In reactor applications, however, it is desirable to establish a sealed connection at least between the outer rings 268 through the use of the aforementioned brazing material. The O-rings 276 and 278 desirably are fabricated from the same material as that of the associated contacting rings 252 and 268. The respective cross-sectional configurations of the grooves 272 and 274 and of the O-rings 276 and 278 are sized such that when the components of the thermoelectric stage are assembled, as in FIG. 5, spaces exist between the thermoelectric washers 240 and 242 and their corresponding contacting rings for the proper positioning of the insulating disks 244 and 246.

Figure 7:
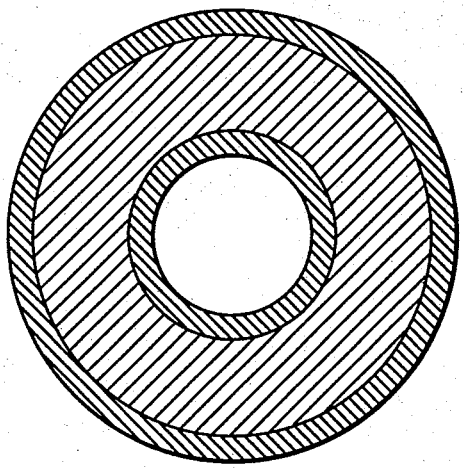
FIGS. 7 and 8 illustrate steps in the process of fabricating certain of the components employed in the energy converters of FIGS. 1 and 2.
Figure 8:
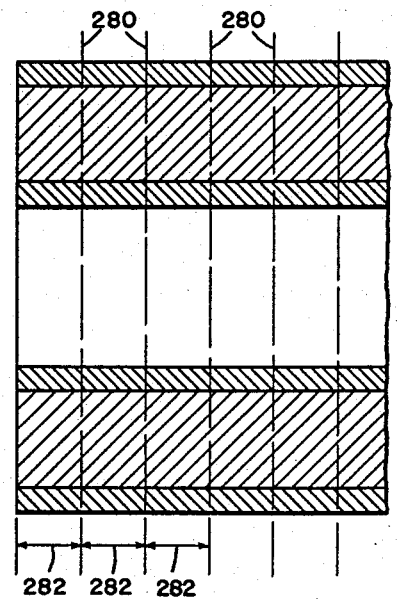

Referring now to FIGS. 7 and 8 of the drawings, one method and arrangement is shown therein for applying the contacting rings 252 and 268 to the associated thermoelectric washers. In this arrangement, a billet (not shown) consisting of spaced inner and outer cylinders with a quantity of the desired thermoelectric material and interposed is drawn through a suitable die to form the annular extrusion illustrated in FIGS. 7 and 8. The co-extrusion of the materials comprising the contacting rings 252 and 268 and the thermoelectric material 240 or 242 sandwiched therebetween provides a bond which ensures electric contact between these components. The extruded arrangement of FIG. 8 is then cut transversely into relatively short segments as denoted by the reference lines 280. Each of the cutoff portions 282 then forms an assembly consisting of the outer contacting ring 268, the inner contacting ring 252 and the thermoelectric washer 240 or 242 bonded therebetween.

Referring again to FIGS. 2 to 4 of the drawings, the thermoelectric stage thereof can consist of about from 100 to 200 or more junctions depending upon the length of the fuel element-converter 10 and the transverse thicknesses of the thermoelectric washers 240' and 142'. With this arrangement, the thermoelectric output alone of the converter 10 can be in the order of 5 to 10 or more volts. A similar output is obtained from the thermionic stage of the converter 10.

Figure 10:
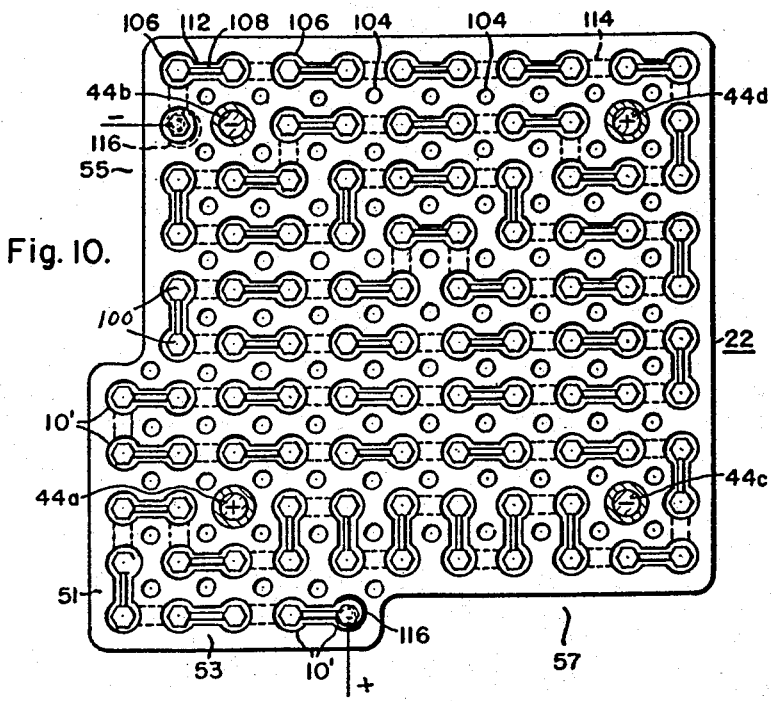
FIG. 10 is a cross-sectional view of the fuel element assembly of FIG. 9 and taken along reference line X—X thereof.
Figure 9:
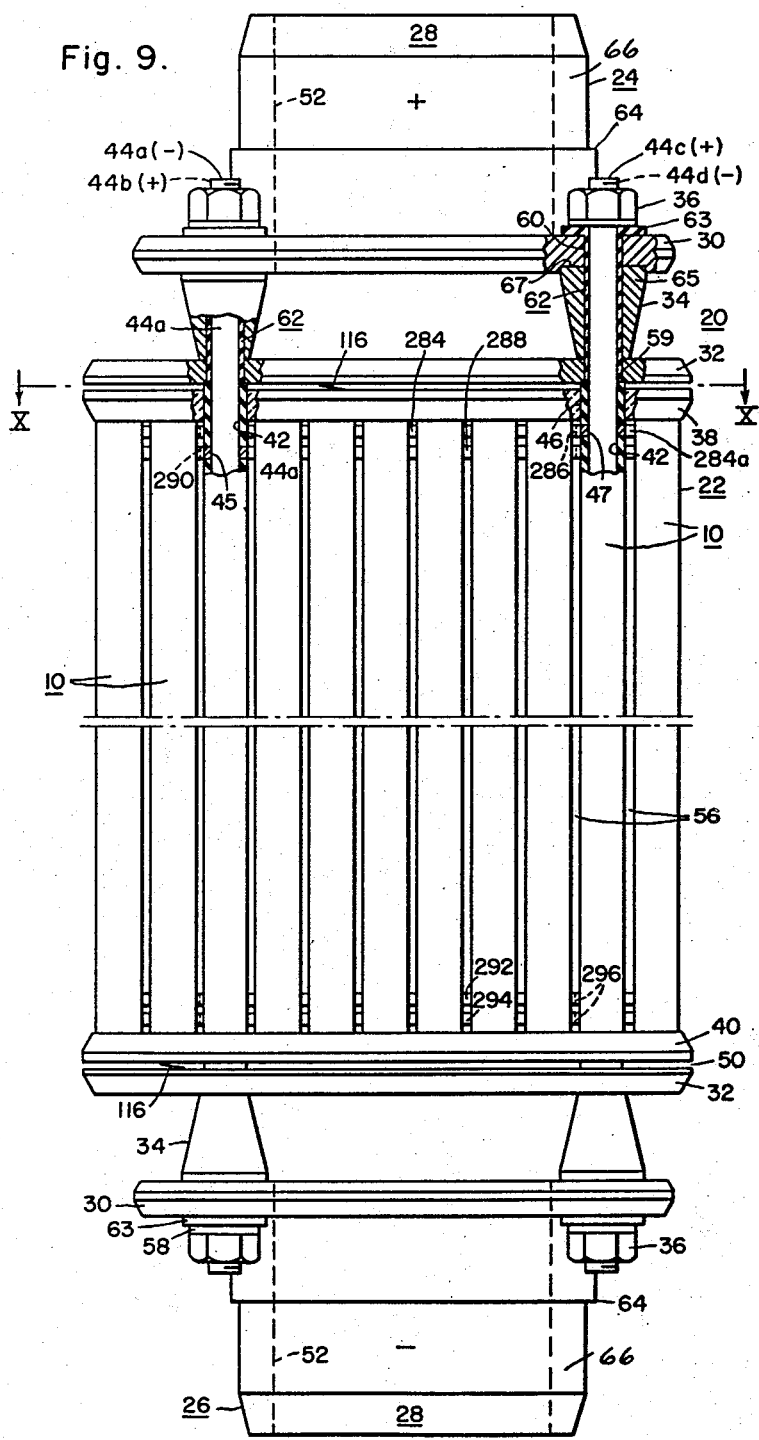
FIG. 9 is an elevational view, partially sectioned, of an exemplary fuel assembly adapted for use in a nuclear reaction and for supplying support and electrical connections to a plurality of the fuel element converters of FIGS. 2 to 4.

Referring now to FIGS. 9 and 10 of the drawings, an illustrative form of fuel assembly 20, adapted for supporting a plurality of the fuel element-converters 10, is illustrated therein. The latter arrangement of the invention comprises a fuel bundle indicated generally by the reference character 22, to each end of which is secured a flow nozzle assembly 24 or 26, respectively. Each of the flow nozzle assemblies 24 and 26 includes in this example a flange flow nozzle 28 and a mounting plate 32. The aforesaid component parts of the nozzle assembly are spaced from one another by a number of spacers 34, with four being employed in each nozzle assembly 24 or 26 in this example of the invention.

The pair of mounting plates 32, which are individually arranged at positions adjacent end plates 38 and 40 of the fuel element bundle 22, are each separated by a number of tie rod sleeves 42 passing through the fuel bundle 22 and bearing against the opposing surfaces of the mounting plates 32. For the purpose of electrically insulating the aforesaid mounting plates 32, the tie rod sleeves are fabricated from a ceramic material such as aluminum oxide or one of the other ceramic materials mentioned above. The sleeves 42 of the frontward rods 44a and 44c however, are provided adjacent their upper ends with short conductive, tubular members 45 and 47 respectively through which electric contact is made between the tie rods 44a and 44c and the thermoelectric stages of certain of the converters 10. Similar conductive members (not shown) are furnished adjacent the lower ends of the sleeves 42 of the rod 44b and 44d for making electric contact with the thermoelectric stages of the remainder of the converters 10. The assembly of the nozzles 28, their associated components, and the fuel element bundle 22 are secured together by means of tie rods 44 inserted individually through each of the aforesaid insulating sleeves 42 and secured to the nozzle assemblies at the respective threaded ends by means of nuts 36. The mounting plates 32 and the remaining components of each flow nozzle assembly 24 or 26 are thus rigidly joined with the mounting plates bearing against the respective ends of the tie rod sleeves 42. In this arrangement then, each of the end plates 38 and 40 of the fuel bundle 22 are more or less slidably mounted upon the tie rod sleeves 42 as a result of the tie rod sleeves having been inserted and fitted relatively closely through appropriate apertures 46 formed in each of the end plates 38 and 40.

As will be explained hereinafter in greater detail, the fuel bundle 22 is made up of a plurality of converters 10 each of which is formed with a quantity of one or more of the fissile isotopes mentioned heretofore. Accordingly, when an adequate number of fuel assemblies 20 are arranged within a neutronic reactor for sustaining a chain reaction therewithin, individual converters 10 thereof, which contain the source of the heat output of the reactor will expand accordingly to a greater extent than the component structural parts of the fuel assembly 20. For this reason, in order to permit relative expansion between the converters 10, and the component parts of the assembly, gaps 50 are provided initially between the end plates 38 and 40 and mounting plates 32 of the nozzle assemblies 24 and 26, respectively.

Each of the nozzles 28 is provided with a relatively large opening 52, which provides access and egress, as the case may be, for coolant fluid flowing through the fuel bundle 22 and more specifically through flow passages 56 provided within the fuel bundle 2 between adjacent ones of the converters 10 in a manner presently to be elaborated upon. The flow nozzles 28 are each secured by means for the associated flange 30 and the nuts 36 to the tie rods 44, the ends of which are inserted into suitably disposed apertures 60 of the flange 30. Each flow nozzle 28 is further provided with a circumferentially projecting shoulder 64 which is arranged to engage the inner surface of the top and bottom supporting structures 302 and 304 (FIG. 12) of a reactor core, whereby the tubular end portions 66 of the nozzle 28 can be inserted into suitably spaced and aligned apertures formed respectively in the aforesaid supported structures 97 and 98 and thus the fuel element assembly 20 is suspended and positioned within the reactor core. The arrangement of fuel assemblies 20 with a reactor core, in this fashion, is shown in detail in a copending application of Robert J. Creagan, entitled "Neutronic Reactor," filed September 27, 1957, Serial No. 686,778 and assigned to the present assignee.

As shown more fully in FIG. 10 of the drawings, the fuel bundle 22 is formed with stepped portions 51 and 53 on adjacent sides thereof. These stepped portions are disposed thusly to form channels 55 and 57 between adjacent closely spaced fuel assemblies 20 for the insertion of control rods as described in the aforesaid copending application and subsequently in connection with FIG. 11 hereof. Additional converters 10′ are mounted at the stepped portions in order to eliminate vacancies at these points within the fuel assembly 20. Otherwise, these vacancies would induce neutronic flux peaking thereat due to an excess of reactor coolant if the latter also serves as the moderator.

The flow nozzle 28 with its flange 30 and mounting plate 32 are insulated from the tie rods 44 in this example, by means of an elongated bushing 62 fabricated from an electrically insulating material such as one of the ceramics mentioned heretofore. The flange portion 63 of the bushing then operates to insulate electrically the nut 36 and associated washer 58 and tie rod 44 from the nozzle flange 30. Similarly, the inward sleeve portion 59 of the insulating bushing 62, which for ease of fabrication, can be furnished in two or more parts if desired, operates to insulate the mounting plate 32 from the tie rods 44 passing therethrough.

Each flow nozzle 28 is positioned precisely relative to the fuel bundle 22 and tie rods 44 by the insertion of the outward end portion 65 of the spacing members 34 into complementary recesses 67 formed in the interior surface of the nozzle flange 30 and surrounding each aperture 60 thereof. The tie rod sleeves 42 are relatively thicker than the adjacent end portions of the bushings 62 in order that the ends of these sleeves will bearingly engage the inward surfaces of the mounting plates 32 to maintain the desired spacing therebetween.

As indicated heretofore, the fuel bundle 22 of the assembly 20 comprises a plurality of the converters 10, which in this application of the invention 105 are employed and which have been described in greater detail in connection with FIGS. 2 and 3 of the drawings. For the purpose of making electrical connections to the thermionic stages (through end plugs 12 and 13) of the converters 10 comprising the fuel bundle 22, as to be described hereinafter in connection with FIG. 10, each of the converters 10 is relatively inverted with relation to adjacent ones of the converters 10, as better shown in the cutaway portion of FIG. 9. With this arrangement, then, the positive end plug 12 of one converter 10 can be connected to the negative end plug 13 of an adjacent converter.

In one example of the invention, the converters 10 are secured or suspended between the end plates 38 and 40 of the fuel assembly 20 and are secured at their respective extremities by means of fillister headed screws 100 inserted through suitable apertures 102 in the end plate 38 or 40 and threaded respectively into the tapped holes 80 or 90 provided at each end respectively of the converter 10. In order to precisely position each of the converters 10, each of the aforesaid apertures 102 are countersunk adjacent the inward openings thereof to receive the annular projections 12b or 13b (FIG. 2) of the converter 10. These projections fit relatively closely within the aforesaid countersunk portions and thus the converters 10 are precisely spaced from one another in order to provide the required flow passages 56 therebetween and the required spatial distribution of the nuclear fuel within the reactor core. The aforesaid flow passages 56 each communicate with the openings 52 in the flow nozzles 28, through a like number of aligned apertures 104 formed in each of the end plates 38 and 40 and the mounting plates 32, as better shown in FIG. 4 of the drawings.

In order to recess each of the heads of the screws 100 below the outer surface of each end plate 38 or 40, a recess 106 is formed about the outer opening of each of the apertures 102. In this arrangement of the invention, the fillister headed screws 100 together with the conductive components of each converter 10 are insulated from like components of adjacent fuel elements by forming each of the end plates 38 and 40 from an electrically insulating material, for an example one of the aforementioned ceramics. In furtherance of this purpose, the heads of the screws 100 are depressed below the outer surfaces of the end plates as aforesaid in order to avoid contacting the metallic and conductive mounting plates 32 upon thermal expansion of the fuel bundle 22 longitudinally along the length of the tie rod sleeves 42. When insulated from one another in this fashion, the thermionic stages of the converters 10 are connected in electrical series with one another, as better shown in FIG. 10 of the drawings, by means of electrically conductive straps 108 and 110. The conductive straps 108 and 110 likewise are depressed in the outer surface of the end plates 38 and 40, respectively, of the fuel bundle 22 by means of grooves 112 and 114 provided for this purpose and connecting certain ones of the depressions 106 surrounding the heads of the screws 100. The conducting straps 108 and 110 can be secured to adjacent pairs of the fillister headed screws 100 and thence to the converters 10, in any convenient manner such as by spot welding the straps to the respective screw heads.

The thermionic stages of the end fuel elements of the electrical series or series-parallel arrangement, for example the series arrangement of FIG. 10, are connected electrically to the conductive mounting plates 32 respectively by means, for an example, of a spring biased electrode 116 inserted between the associated fillister headed screw 100 and the adjacent mounting plate 32, as better shown in FIG. 10 of the drawings. In this manner, electrical contact will be maintained despite thermally induced movements of the end plates 38 and 40. The remaining components of the nozzle assemblies 24 and 26, having likewise been fabricated from an electrically conductive material, then serve as means for making electrical connection to the series coupled converters 10 in the bundle 22. As indicated heretofore, these flow nozzle assemblies are electrically insulated from the tie rods 44 and other component parts of the assembly 20 and hence from one another by the insulating members 62 and 63. Therefore, as shown in FIGS. 9 and 10, the upper flow nozzle assembly 24 is the positive terminal of the series connected thermionic stages of the converters 10 while the lower nozzle assembly 26 is the negative terminal.

When some of the converters 10 are inverted as shown in FIG. 9, it will be seen that the inverted converters 10 have their positive thermoelectric terminal 266 (FIG. 2) more closely adjacent the insulating end plate 38 than is the case of the negative thermoelectric terminals 270 (FIG. 2). The positive terminals then are connected by a plurality of elongated straps 284 extending transversely across the fuel assembly 20 and between the rows of fuel element-converters 10. Each of the straps 284 is joined to each of the positive terminals 266 of the adjacent row of converters 10. In addition, an appropriate one of the straps 284a is joined to the conductive ring 47 of the tie rod 44c. Electrical connection between the straps 284 is obtained by an additional one or more straps 286 extending at right angles to the straps 284 with one also secured to the conductive ring 47. Electric contact between the positive terminals 266, the conductive ring 47, and the straps 284 and 286 where joined as aforesaid, is made by brazing, for example. In this fashion, all of the positive terminals 266 adjacent the upper end of the fuel asembly are joined electrically to the tie rod 44c.

In a similar manner, those of the converters 10 having negative thermoelectric terminals 270 (FIG. 2) adjacent the upper end of the fuel assembly 20 are coupled electrically to the tie rod 44a through its contact ring 45 and the transverse and radial conductive strips 288 and 290 respectively. As can be seen from the drawings, the positive bands 284 and 286 are displaced longitudinally from the negative bands 288 and 290 to avoid short circuiting the positive and negative thermoelectric terminals 266 and 270. The thermoelectric terminals 266 and 270, adjacent the lower end of the fuel bundle 22, are connected in similar manner to the tie rods 44b and 44d (FIG. 10), respectively, by means of conductive straps 292 and 294. With this arrangement, it will be seen that the thermoelectric stages of the converters 10 are effectively divided into two parallel connected groups, which in turn are electrically connected to the tie rods 44a and 44c, 44b and 44d. Suitable conductors can be secured to the exposed upper or lower end of these tie rods to further connect the aforementioned groups of converters into parallel or series parallel arrangements. If it is desired to employ the series parallel connection, the positive and negative terminals 266 and 270 at one end of the bundle 22, for example the lower end, can be connected internally for example by the use of a relatively wider strap (not shown) extending at right angles to the straps 292 and 294 in place of the illustrated straps 296.

In one illustrative application of the invention, the converters 10 are provided with a length of about 100 inches while the diameter of the fuel material 19 is about 300 mils. The cathode 16 and the anode 11 each can be from 5 to 15 mils in thickness depending upon the workability of the materials employed therefor and upon internal reactor pressure. As pointed out previously, the width of the intervening space 21 (FIG. 2) in the thermionic stage should be as small as feasible and, considering manufacturing techniques, the space 21 can be on the order of 0.1–5 mm. If it is desired to employ converters 10 of less than the indicated length, while still preserving the indicated height of the reactor core, two or more of the converters can be supported in tandem along the length of the fuel bundle 22 in a manner disclosed in a copending application of W. E. Sturtz et al., entitled "Rod Type Fuel Assembly," filed November 2, 1956, Serial No. 620,071, and assigned to the present assignee. Obviously, the shorter fuel elements can be insulated in the manner such as that taught herein in connection with FIGS. 9 and 10.

From the foregoing, it will be apparent that a very compact combination fuel element and thermionic-thermoelectric converter 10 has been disclosed herein. The compactness of the converters 10 enable a relatively large number of these devices to be assembled in a generally parallel array in each fuel assembly 20. Although the converters 10 of each fuel assembly 20 have been described as being connected in certain electrical arrangements, obviously the converters 10 can be coupled in other electrical arrangements, through obvious circuit changes. Furthermore, where all of the thermionic converters 10 of a given fuel assembly 20 are coupled in electrical parallel, the end plates 38 and 40 need not of course be fabricated from an insulating material. Returning to the radial dimensions of the converter 10, the tubular connecting members, in one example of the invention, can be about 5 to 25 mils, while the thermoelectric washers can be about 20 to 30 mils.

Figure 11:
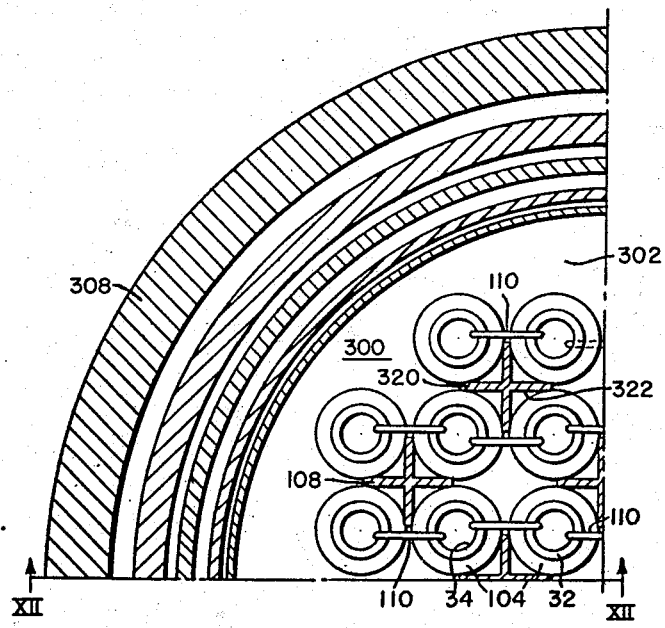
FIG. 11 is a partial cross-sectional view taken along reference line XI—XI of FIG. 12 of one form of nuclear reactor with which the fuel assembly of FIGS. 9 and 10 is employable.
Figure 12:
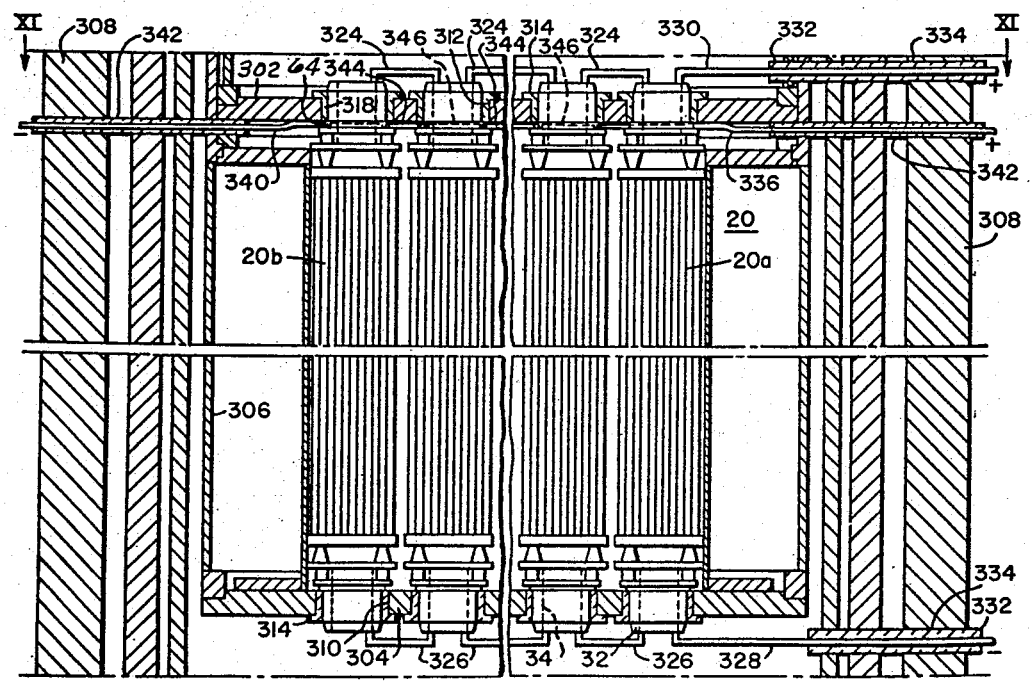
FIG. 12 is a partial longitudinally sectioned view of the nuclear reactor shown in FIG. 11 and taken along reference line XII—XII thereof.

Referring now to FIGS. 11 and 12 of the drawings, a plurality of the fuel element assemblies 20 are supported within a nuclear reactor core 300 partially illustrated in the drawings and comprising an upper core supporting plate 302 and a lower core supporting plate 304, both of which are joined to a cylindrical core casing member 306. The reactor core 300 is supported, by suitable structure (not shown), within a closed reactor vessel indicated generally at 308. Structural and operational details of the nuclear reactor and component equipment are presented in the aforesaid copending application of Robert J. Creagan. Accordingly, a more detailed description of the deterogeneous type reactor described therein, and with which the fuel element and assembly of the present invention is intended to be employed, is not deemed necessary.

Each of the upper and lower core supporting plates 302 and 304 are provided with a plurality of aligned apertures 310 and 312, respectively, into each of which is inserted a flanged ceramic insulating bushing or member 314. In this example, the insulating members 314 are fabricated from one of the ceramic materials noted heretofore. The fuel element assemblies 20 are suspended spacedly within the reactor core by insertion of the flow nozzles 32 thereof respectively into aligned pairs of apertures 310 and 312, with the fuel element assemblies 20 being positioned longitudinally of the reactor core 300 by engagement of nozzle shoulders 64 with the inwardly extending extremities 318 of the insulating members 314, respectively. A plurality of control rods 320, desirably of cruciform configuration, are inserted between selected groups of the fuel element assemblies 20, through suitable apertures 322 (FIG. 11) provided in the upper core supporting plate 302 and into the channels 55 and 57 adjacent the stepped portions 51 and 53 (FIG. 10) of the assemblies 20, for the purpose of appropriately controlling the chain reaction sustained within the reactor core 300.

Each of the fuel assemblies 20 thus are insulated electrically from the upper and lower core supporting plates 302 and 304 and consequently from one another by the intervention of the aforesaid insulation members 314. More importantly the latter members prevent the respective positive and negative terminals of the converters 10 from being short-circuited through the core casing 306. With this arrangement, all of the fuel assemblies 20 of the reactor core 300 can be connected either in various electrical arrangements, for example, the thermionic stages can be connected in parallel, by upper and lower electrically conductive straps or bars 324 and 326 respectively, as better shown in the drawings. Although it is contemplated that all of the thermionic terminals represented by the nozzle assemblies 24 and 26 of the reactor core be coupled in parallel; for purposes of illustration, only those nozzle assemblies shown in the northwest quadrant of the reactor core, as illustrated in FIGS. 11 and 12 are so coupled. The direct electrical output of the reactor is withdrawn therefrom by means of electrical leads 328 and 330. As better shown in FIG. 12, the leads 328 and 330 extend outwardly through the wall of the reactor vessel 308 and are insulated electrically therefrom by means of a pair of cylindrical insulators 332 individually inserted through apertures 334 in the wall of the reactor vessel and hermetically sealed thereto and to the conductors 328 and 330, respectively.

In a similar manner, the thermoelectric output of the fuel assemblies 20 is withdrawn through the reactor vessel leads 336 and 340. The leads 336 and 340 are positive and negative terminals respectively and are insulated and sealed to the reactor vessel wall by means of insulators 342 in a manner similar to that described in connection with the leads 330 and 328. In this arrangement, the series parallel connected groups of converters 10 of each fuel assembly 20 are connected in series by conductive straps or leads 344 connected to the front tie rods 44a and 44c, as shown in FIG. 12 and by additional leads or straps 346 connected respectively to each pair of tie rods 44b and 44d of the fuel assemblies. The positive end of this series connection, represented by the tie rod 44c of fuel assembly 20a (FIG. 12) is connected to the lead 336, while the negative end of the series arrangement, represented by the tie rod 44a of fuel assembly 20b is connected to the negative reactor lead 340.

With the arrangement shown and depending upon the erspective work functions of the materials of the cathode 16 and anode 11 of each converter 10, it is contemplated that the thermionic electric output potential of the reactor shown in FIGS. 11 and 12 will lie in the neighborhood of 300 volts. Another factor affecting the voltage output of course will be the type and the amount of ionized gas or vapor in the spaces 21 of the converters 10. This, of course, represents the thermionic potential of a single fuel assembly 20, for the assemblies are connected in parallel. Inasmuch as a relatively large number of fuel assemblies 20, in this example 32, are employed in a power reactor and as in this application they are coupled in electrical parallel, it is obvious that this voltage output can be supplied at a substantial current rating. It is contemplated of course that if higher thermionic voltages are desired, the nozzle assemblies 24 and 26 can readily be coupled in series or series-parallel arrangements in the well known manner.

In addition to the aforementioned thermionic output, the thermoelectric output of the reactor, taken from the leads 336 and 340 will be in the neighborhood of about 300 volts. This projected output is based upon the assumption that the thermoelectric stage of each fuel element-converter 10 will comprise approximately 100 junctions. Inasmuch as each junction is capable of generating a minimum of 0.05 volt the thermoelectric output of each fuel assembly 20 will be at least 10 volts, as the thermoelectric stages thereof are series-parallel connected into two groups. Accordingly, the employment of 32 such assemblies will produce a thermoelectric output of at least 300 volts in addition to the aforementioned thermionic output. In addition, it may be pointed out that the parallel electrical connection of these thermoelectric stages into groups of at least 50 such stages will permit the thermoelectric voltage output to be supplied at a substantial current rating. Higher thermoelectric voltages can be obtained if desired by connecting the converters 10 of each fuel assembly 20 into a larger number of series connected groups, in an obvious manner. It will also be apparent that a combined thermionic-thermoelectric voltage output can be obtained simply by connecting the thermionic and thermoelectric stages of each converter 10 internally in electrical series, for example by extending the positive thermoelectric lead 266 inwardly, instead of outwardly, to contact the negative thermionic terminal represented by the end plugs 13 (FIG. 2).

With reference to the converters illustrated in FIGS. 1 and 2, it is also contemplated that the aforementioned space charge can be at least partially eliminated or compensated by spacing the cathode and anode of each converter very closely, depending upon allowable manufacturing tolerance.

From the foregoing, it will be apparent that novel and efficient forms of a thermionic-thermoelectric converter, particularly in combination with a nuclear fuel element and fuel assembly or other radioisotope heat source, has been disclosed herein. Numerous modifications of the invention will occur to those skilled in the art to which it pertains without departing from the spirit and scope of the invention. Moreover, it is to be understood that certain features of the invention can be employed without a corresponding usage of other features thereof. Accordingly, the descriptive materials presented herein are intended as illustrative rather than limitative of the invention.

Therefore, what is claimed as new is:

1. An energy converter comprising a generally tubular cathode, a generally tubular anode spaced outwardly of said cathode in heat transfer relationship therewith and forming an envelope for said converter, means for sealing the ends of said envelope and for coupling said cathode to a heat source in heat transfer relationship therewith, a pair of thermoelectric materials mounted adjacent said anode but outwardly thereof, conductive means for forming a hot junction between said thermoelectric materials at a position adjacent said anode in heat transfer relationship therewith and for forming a cold junction between said materials at a position relatively removed from said envelope, and means for making electric contact to said cathode, said anode, said hot junction, and said cold junction respectively.

2. An energy converter comprising a tubular cathode, a tubular anode spaced outwardly of said cathode in heat relationship therewith and forming an envelope for said converter, means for sealing the ends of said anode and said cathode respectively, a heat source consisting essentially of a radioactive isotope contained within said cathode in heat transfer relationship therewith, at least one pair of thermoelectric members mounted adjacent the outer surface of said anode, conductive means forming a hot junction between said members at a position adjacent said anode, said last mentioned means being disposed in heat transfer relation to said anode so as to utilize heat from said heat source, means for forming a cold junction between said members at position relatively removed from said anode, and means for making electrical contact to said cathode, said anode and said hot and cold junctions respectively.

3. A fuel element-converter comprising a generally tubular conductive envelope forming an anode of said converter, a cathode spaced inwardly of said anode in heat transfer relationship therewith and being formed at least partially from a fissile material, means for sealing the ends of said envelope, at least one pair of thermoelectric members mounted adjacent the outer surface of said envelope, conductive means forming a hot junction between said members at a position adjacent the outer surface of said envelope, said conductive means being disposed in heat transfer relation to said envelope so as to utilize heat from said fissile material, additional conductive means for forming a cold junction between said members at a position relatively removed from said anode, and means for making electric contact to said cathode, said anode, and said hot and cold junctions.

4. An energy converter comprising a tubular cathode, a tubular anode spaced outwardly of said cathode in heat transfer relationship therewith and forming an envelope for said converter, means for sealing the ends of said anode and said cathode respectively, a heat source consisting essentially of radioactive isotope contained within said cathode in heat transfer relationship therewith, at least one pair of thermoelectric members mounted adjacent the outer surface of said anode, conductive means forming a hot junction between said members at a position adjacent said anode, said last mentioned means being disposed in heat transfer relation to said anode so as to utilize heat from said heat source, means for forming a cold junction between said members at a position relatively removed from said anode, means for making electrical contact to said cathode, said anode and said hot and cold junctions respectively, an means for radiating heat from the external surface of said cold junction means.

5. An energy converter comprising an elongated cathode formed at least partially from a radioactive heat source material, an elongated envelope spaced outwardly of said cathode in heat transfer relationship therewith and generally coextending therewith, said envelope being formed from a conductive material to serve as an anode for said converter, means for sealing the ends of said envelope, a plurality of pairs of thermoelectric members mounted adjacent said anode, conductive means for forming a plurality of hot junctions between said members at positions relatively adjacent said anode, said hot junction means being disposed in heat transfer relation with said anode so as to utilize heat from said heat source, means for forming a plurality of cold junctions between said members at positions relatively removed from said anode and means for insulating said cold junctions and said hot junctions from another and for insulating said hot junctions from said anode, said thermoelectric members being assembled into electrical-series by said hot and said cold junction means, and means for making electrical contact to said cathode, said anode, and said thermoelectric series.

6. An energy converter comprising a cathode, an envelope spaced outwardly of said cathode in heat transfer relationship therewith, said envelope being formed from a conductive material to serve as an anode for said converter, means for heating said cathode, at least one pair of thermoelectric members disposed adjacent the outer surface of said anode, means for forming a hot junction between said members at a position relatively adjacent the outer surface of said anode, said hot junction means being disposed between said thermoelectric member and said anode in a heat transfer relationship for heating said hot junction and for simultaneously cooling said anode, means for forming a cold junction between said members at a position relatively removed from said anode, said hot junction means being in heat conductive relation to said anode so as to utilize heat from said heating means, and means for making electric contact to said cathode, said anode, and said hot and cold junction means.

7. An energy converter comprising an elongated rod-like cathode, means for supplying heat to said cathode, a generally tubular elongated envelope spacedly surrounding said cathode in heat transfer relationship therewith, said envelope being fabricated from a conductive material to serve as an anode for said converter, a plurality of pairs of annular thermoelectric members spacedly surrounding said anode in heat transfer relationship therewith and further spaced in tandem along the length of said anode, a number of conductive tubular members secured to inner surfaces of said thermoelectric members to form hot junctions therebetween, said conductive members also surrounding said anode in heat transfer relationship so as to utilize heat from said heating means, a number of additional conductive members joined to the outer surfaces of said thermoelectric members to form cold junctions therebetween, said additional conductive tubular members surrounding said thermoelectric members, means for insulating said conductive members from one another and for insulating the first mentioned conductive members from the outer surface of said anode, said thermoelectric members and said conductive members forming a thermoelectric series extending generally along the length of said anode, and means for making electric contact to said cathode, said anode, and said thermoelectric series.

References Cited by the Examiner

UNITED STATES PATENTS

| | | | |
|---|---|---|---|
| 2,543,331 | 2/51 | Okolicsanyi | 136—4 |
| 2,811,568 | 10/57 | Lloyd | 136—4 |
| 2,856,341 | 10/58 | Kanne | 136—4 |
| 2,864,074 | 12/58 | Johnstone | 310—4 |
| 2,902,423 | 9/59 | Luebke et al. | 136—4 |
| 2,913,510 | 11/59 | Birden et al. | 136—4 |
| 2,915,652 | 12/59 | Halsopoulos et al. | 136—4 |

References Cited by the Applicant

UNITED STATES PATENTS

| | | |
|---|---|---|
| 3,005,766 | 10/61 | Bartnoff. |
| 3,008,890 | 11/61 | Bartnoff. |

WINSTON A. DOUGLAS, *Primary Examiner.*

JOHN H. MACK, LEON D. ROSDOL, CARL D. QUARFORTH, *Examiners.*